United States Patent
Chao et al.

(10) Patent No.: US 10,993,079 B2
(45) Date of Patent: Apr. 27, 2021

(54) MOTION DETECTION METHOD, DEVICE, AND MEDIUM

(71) Applicant: BAIDU ONLINE NETWORK TECHNOLOGY (BEIJING) CO., LTD., Beijing (CN)

(72) Inventors: Xin Chao, Beijing (CN); Penghui Xu, Beijing (CN); Zhiyuan Liang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/514,034

(22) Filed: Jul. 17, 2019

(65) Prior Publication Data

US 2020/0029176 A1    Jan. 23, 2020

(30) Foreign Application Priority Data

Jul. 19, 2018  (CN) .......................... 201810796567.2

(51) Int. Cl.
| | | |
|---|---|---|
| G06N 3/02 | (2006.01) | |
| H04W 4/029 | (2018.01) | |
| H04W 4/02 | (2018.01) | |

(52) U.S. Cl.
CPC .......... *H04W 4/029* (2018.02); *H04W 4/027* (2013.01)

(58) Field of Classification Search
CPC .......... G06N 3/02; G06N 20/00; G06N 20/20; G06N 3/08; G06N 5/00; G06N 3/086; G06K 9/66
See application file for complete search history.

(56) References Cited

U.S. PATENT DOCUMENTS 9,769,794 B1*   9/2017  Sitaram ................. H04W 68/02
2006/0187028 A1  8/2006  Kiang et al.
(Continued)

FOREIGN PATENT DOCUMENTS

CN    201691930 U    1/2011
CN    102252676 A    11/2011
(Continued)

OTHER PUBLICATIONS

Sharma et al., "Modeling Abstract Concepts for Internet of Everything: A Cognitive Artificial System", 2018 13th APCA International Conference on Automotive Control and Soft Computing, Jun. 4-6, 2018, Ponta Delgada, Azores, Portugal, 6 pages.
(Continued)

*Primary Examiner* — Rafael Pérez-Gutiérrez
*Assistant Examiner* — Xiang Zhang
(74) *Attorney, Agent, or Firm* — Fay Sharpe LLP

(57) ABSTRACT

The present disclosure provides a motion detection method, a device, and a medium. The method includes: verifying a pre-trained model according to a present posture of an intelligent device in a mobile carrier, and accelerations of the intelligent device when the mobile carrier is in different motion states, the pre-trained model being corresponding to a preset posture; taking a model passing the verifying as a prediction model; and inputting a collected-presently acceleration of the intelligent device to the prediction model, to output a prediction motion state of the mobile carrier.

18 Claims, 3 Drawing Sheets

(56) References Cited

U.S. PATENT DOCUMENTS

| | | | | |
|---|---|---|---|---|
| 2010/0148952 | A1* | 6/2010 | Barajas | B60R 25/00 340/450.2 |
| 2011/0313957 | A1 | 12/2011 | Ide | |
| 2017/0131719 | A1* | 5/2017 | Micks | G08G 1/166 |
| 2017/0241786 | A1* | 8/2017 | Ohira | G01C 21/16 |
| 2017/0305349 | A1* | 10/2017 | Naboulsi | B60R 1/025 |
| 2018/0077538 | A1* | 3/2018 | Matus | G08B 21/04 |
| 2019/0122551 | A1* | 4/2019 | Madrigal | G07C 5/0841 |
| 2019/0193730 | A1* | 6/2019 | Voorheis | B60W 30/12 |
| 2019/0283669 | A1* | 9/2019 | Jiang | B60Q 3/80 |
| 2019/0337512 | A1* | 11/2019 | Tahmasbi-Sarvestani | B60W 40/09 |

FOREIGN PATENT DOCUMENTS

| | | |
|---|---|---|
| CN | 104297519 A | 1/2015 |
| CN | 105303183 A | 2/2016 |
| CN | 105510870 A | 4/2016 |
| CN | 105760836 A | 7/2016 |
| CN | 106228200 A | 12/2016 |
| CN | 106600626 A | 4/2017 |
| CN | 106679657 A | 5/2017 |
| CN | 106705968 A | 5/2017 |
| CN | 106709471 A | 5/2017 |
| CN | 107016342 A | 8/2017 |
| CN | 107212890 A | 9/2017 |
| CN | 108052960 A | 5/2018 |
| CN | 108182004 A | 6/2018 |
| DE | 102013213067 A1 | 1/2015 |
| JP | 2017106756 A | 6/2017 |
| KR | 20120013842 A | 2/2012 |
| WO | 2017193311 A1 | 11/2017 |

OTHER PUBLICATIONS

Brandon Wagstaff et al., "LSTM-Based Zero-Velocity Detection for Robust Inertial Navigation", 2018 International conference on Indoor Positioning and Indoor Navigation (IPIN), Sep. 24-27, 2018, Nantes, France, 8 pages.

Hubert P.H. Shum et al., "Real-Time Posture Reconstruction for Microsoft Kinect", IEEE Transactions on Cybernetics (vol. 43, Issue: 5, Oct. 2013), Date of Publication: Aug. 22, 2013, Abstract, 2 pages.

Guoliang Fan et al., "Gaussian process for human motion modeling: A comparative study", ResearchGate, Sep. 2011, 7 pages.

Office Action for European Patent Application No. 19187164.9, dated Dec. 11, 2019, 9 pages.

Office Action for Korean Patent Application No. 10-2019-082755, dated Feb. 19, 2020, 5 pages (English Translation, 6 pages).

Office Action for Chinese Application No. 201810796567.2, dated Apr. 21, 2010, 14 pages.

Zhou Qing, "The Design of Human Motion Detection System and the Study of Fall Prediction Method", East China Normal University, 2014, 84 pages. English Abstract.

Office Action for Japanese Application No. 2019-133210, dated Sep. 29, 2020, 4 pages.

* cited by examiner

MOTION DETECTION METHOD, DEVICE, AND MEDIUM

FIELD

The present disclosure relates to a field of mobile carrier detection technologies, and more particularly to a motion detection method, a device, and a medium.

BACKGROUND

Conventional navigation software updates a location of a mobile carrier, and a motion state of the mobile carrier depending on a change of coordinate location of a point positioned by a Global Positioning System (GPS), or a change of coordinate location of a point positioned by network.

However, when there is a shielding object, such as in indoor, a viaduct area, or a high-rise area, the point positioned by GPS often has location drift. In network positioning based on Wi-Fi (Wireless Fidelity) and a base station, a coordinate location given by network for the point has drift when a signal may not cover the point, or the signal is weak at the point.

Therefore, the motion state of the mobile carrier may not be determined accurately depending on information of the positioned point.

SUMMARY

In a first aspect, embodiments of the present disclosure provide a motion detection method. The method includes: verifying a pre-trained model according to a present posture of an intelligent device in a mobile carrier, and accelerations of the intelligent device when the mobile carrier is in different motion states, the pre-trained model being corresponding to a preset posture; taking a model passing the verifying as a prediction model; and inputting a collected-presently acceleration of the intelligent device to the prediction model, to output a prediction motion state of the mobile carrier.

In a second aspect, embodiments of the present disclosure provide a device. The device includes: one or more processors, a storage device, and an acceleration detector. The storage device is configured to store one or more programs. The acceleration detector is configured to detect an acceleration of the device. When the one or more programs are executed by the one or more processors, the one or more processors are caused to implement the motion detection method according to the above embodiment of the present disclosure In a third aspect, embodiments of the present disclosure provide a computer readable storage medium having a computer program stored thereon. When the computer program is executed by a processor, the motion detection method according to the above embodiment of the present disclosure is implemented.

DETAILED DESCRIPTION

Figure 1:
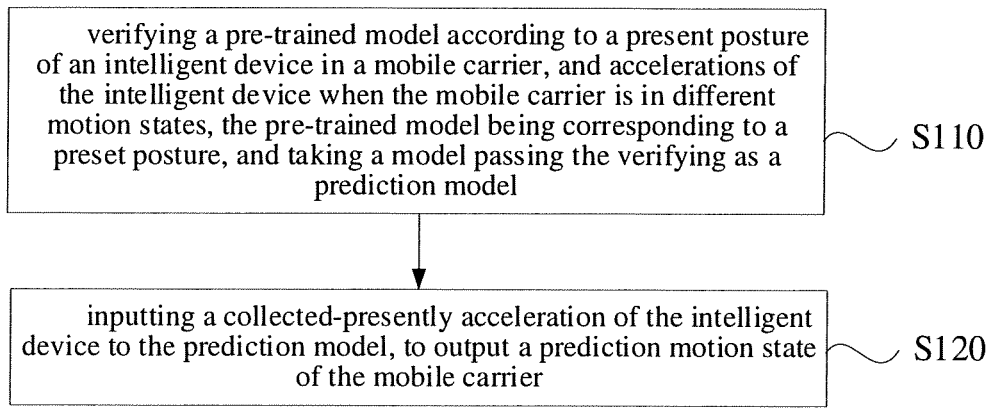
FIG. 1 is a flow chart illustrating a motion detection method provided in Embodiment 1 of the present disclosure.

Description will be made in detail below to the present disclosure with reference to the embodiments and the drawings. It should be understood that, detailed embodiments described herein are intended only to explain the present disclosure, and are not a limitation of the present disclosure. In addition, it should be further noted that, for the convenience of description, only some but not all of the structure related to the present disclosure are illustrated in the drawings.

Embodiment 1

FIG. 1 is a flow chart illustrating a motion detection method provided in Embodiment 1 of the present disclosure. The embodiment may be applicable to a case that a prediction is performed on a motion state of a mobile carrier based on an acceleration of an intelligent device in the mobile carrier. Typically, the mobile carrier may be a vehicle, and the intelligent device may be a mobile phone for performing map navigation for the vehicle. The method may be executed by a motion detection apparatus. The apparatus may be structured in form of software and/or hardware. Typically, the apparatus may be the intelligent device. As illustrated in FIG. 1, the motion detection method provided by this embodiment includes acts in the following blocks.

At block S110, a pre-trained model is verified according to a present posture of an intelligent device in a mobile carrier, and accelerations of the intelligent device when the mobile carrier is in different motion states, and a model passing the verification is taken as a prediction model. The pre-trained model corresponds to a preset posture.

The mobile carrier may be any movable carrier, such as, a vehicle, a steamship, and an airplane, which is not limited by this embodiment.

Alternatively, the intelligent device may be a mobile phone, a table computer, and an on-vehicle terminal, which is not limited by this embodiment.

The present posture of the intelligent device may be determined by any posture determination method in the related art.

In detail, the determination of the present posture of the intelligent device may include:

determining the posture of the intelligent device according to an angle between a direction of the acceleration of the intelligent device and a gravity direction of the intelligent device. The direction of the acceleration of the intelligent device and the gravity direction of the intelligent device may be determined through an acceleration sensor provided in the intelligent device. Typically, the acceleration sensor may be a three-axis acceleration sensor.

The accelerations of the intelligent device when the mobile carrier is in different motion states may be obtained through the acceleration sensor. Different motion states may be determined according to coordinate locations of a plurality of points positioned by GPS, or coordinate locations of a plurality of points positioned by network.

For example, when coordinate locations of a plurality of points positioned by GPS at different time points are same, it is determined that the mobile carrier is rest; otherwise, it is determined that the mobile carrier is moving. When coordinate locations of two points positioned by GPS at neighboring time points are far away, it is determined that the mobile carrier is moving with a high speed; otherwise, it is determined that the mobile carrier is moving with a low speed.

The motion state of the mobile carrier may be rest, moving, moving with the high speed, moving with the low speed, or the like.

In addition, when the motion state of the mobile carrier corresponding to the acceleration of the intelligent device is trusted, the corresponding acceleration of the intelligent device is obtained.

In detail, verifying the pre-trained model according to the present posture of the intelligent device in the mobile carrier, and the accelerations of the intelligent device when the mobile carrier is in different motion states may include: in response to the preset posture corresponding to the pre-trained model matching with the present posture of the intelligent device in the mobile carrier, verifying the matched pre-trained model by using one selected from the accelerations of the intelligent device. The selected acceleration corresponds to a motion state having a duration being greater than a preset duration threshold from different motion states.

The preset posture corresponding to the pre-trained model matching with the present posture of the intelligent device in the mobile carrier may be as follows. A difference between the preset posture corresponding to the pre-trained model and the present posture of the intelligent device in the mobile carrier is lower than a preset posture threshold. That is, the preset posture corresponding to the pre-trained model is basically the same as the present posture of the intelligent device in the mobile carrier. The reason is that, the models obtained by training under different postures of the intelligent device are different.

The preset duration threshold may be provided according to an actual need, which may be 3 seconds or 4 seconds, or longer. Providing the preset duration threshold may ensure a reliability of the obtained motion state. Since the coordinate location of the point fed back by GPS and network is correct at most of moments, the longer the preset duration threshold, the higher the reliability of the obtained motion state is. For example, when it is detected that the duration of the mobile carrier being rest is 3 seconds, it is determined basically that the motion state of the mobile carrier is rest.

When verifying the pre-trained model falls according to the present posture of the intelligent device in the mobile carrier, and the accelerations of the intelligent device when the mobile carrier is in different motion states, training the prediction model is triggered.

Therefore, following effects may be realized. When the pre-trained model is applicable to the present location and the present posture of the intelligent device, the motion state of the vehicle is determined based on the acceleration of the intelligent device by using the pre-trained model. When the pre-trained model is not applicable to the present location and the present posture of the intelligent device, training the prediction model is triggered.

At block S120, a collected-presently acceleration of the intelligent device is input to the prediction model, to output a prediction motion state of the mobile carrier.

The collected-presently acceleration of the intelligent device in the block is the acceleration of the intelligent device collected when the motion state of the mobile carrier is not determined and needs to be predicted. Therefore, the collection for the collected-presently acceleration does not need the time duration that the mobile carrier holds a certain moving state to be greater than the preset duration threshold.

With the technical solution of this embodiment of the present disclosure, the prediction motion state of the mobile carrier is determined according to the acceleration of the intelligent device in the mobile carrier, and the prediction model, thereby implementing to predict the motion state of the mobile carrier.

When locations or states of the intelligent device are different, corresponding prediction models are different. Therefore, the pre-trained model is verified according to the present posture of the intelligent device in the mobile carrier, and the accelerations of the intelligent device when the mobile carrier is in different motion states, thereby ensuring that the determined prediction model is appropriate for the present location and the present posture of the intelligent device.

Further, before verifying the pre-trained model according to the present posture of the intelligent device in the mobile carrier, and the accelerations of the intelligent device when the mobile carrier is in different motion states, the method further includes: collecting different motion states of the mobile carrier and accelerations of the intelligent device when the mobile carrier is in different motion states as training samples; and based on a preset model training algorithm, performing training by using the training samples, to obtain a model trained in advance, and associating the posture of the intelligent device with the model trained in advance.

The preset model training algorithm may be any model training algorithm, such as a neural network algorithm.

In order to ensure the reliability of the motion states of the mobile carrier in the training samples, it needs the duration that the mobile carrier keeps a certain moving state to be greater than the preset duration threshold, and the corresponding acceleration of the motion state within the duration is collected.

For example, when the samples that the motion state of the mobile carrier is rest are collected, and the preset duration threshold is 3 seconds, it needs to ensure that motion speeds of the mobile carrier fed back by GPS with the sequent 3 seconds are 0. The collected acceleration of the intelligent device within the 3 seconds is taken as the rest sample, and the posture of the intelligent device is determined. The determined posture is associated with a model trained by using the rest samples.

In order to improve the accuracy of the sample data, after collecting different motion states of the mobile carrier and the accelerations of the intelligent device when the mobile carrier is in different motion states as the training samples, the method further includes: determining whether a posture change value of the intelligent device is greater than a preset posture threshold in responding to collecting a plurality of samples for training the same model, discarding the sample if yes. That is because the trained models are different under different postures of the intelligent device.

In order to further improve the accuracy of sample data, after collecting different motion states of the mobile carrier and the accelerations of the intelligent device when the mobile carrier is in different motion states as the training samples, the method further includes: performing noise filtering on the training samples.

The noise may be the acceleration which is disadvantage to train the model. In detail, the noise may be an acceleration with a lager fluctuation. For example, the acceleration with the larger fluctuation is caused by a condition that a driving road of the mobile carrier is uneven, the mobile carrier accelerates sharply, the mobile carrier rounds sharply, or the like.

Further, the method further includes: when the number for training failure is more than a preset number, giving up training the model.

The condition causing that training the model fails may be that a user holds the intelligent device in hand. The postures of the intelligent device may be changed continuously when the user holds the intelligent device in hand, thereby causing that training the model fails.

Embodiment 2

Figure 2:
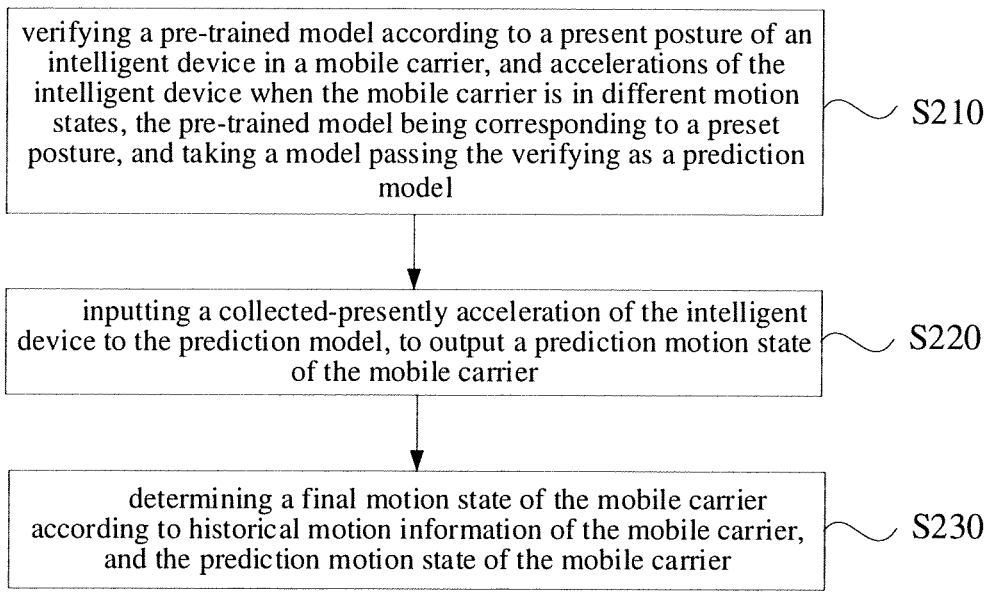
FIG. 2 is a flow chart illustrating a motion detection method provided in Embodiment 2 of the present disclosure.

FIG. 2 is a flow chart illustrating a motion detection method provided in Embodiment 2 of the present disclosure. This embodiment is an alternative solution provided on the basis of the above embodiment. As illustrated in FIG. 2, the motion detection method provided by this embodiment includes acts in the following blocks.

At block S210, a pre-trained model is verified according to a present posture of an intelligent device in a mobile carrier, and accelerations of the intelligent device when the mobile carrier is in different motion states, and a model passing the verification is taken as a prediction model. The pre-trained model corresponds to a preset posture.

At block S220, a collected-presently acceleration of the intelligent device is inputted to the prediction model, to output a prediction motion state of the mobile carrier.

At block S230, a final motion state of the mobile carrier is determined according to historical motion information of the mobile carrier, and the prediction motion state of the mobile carrier.

Alternatively, the final motion state of the mobile carrier is determined according to a historical driving speed of the mobile carrier, and the prediction motion state of the mobile carrier.

For example, when the prediction motion state is rest, a speed determined according to a coordinate of the location point of the mobile carrier fed back by GPS within historical 3 seconds has a deceleration trend, and an average speed within the historical 3 seconds cannot be greater than 10 km/s, it is determined that the final motion state of the mobile carrier is rest. When the prediction motion state is moving with a slow speed, and the average speed of the mobile carrier with the historical 3 seconds is greater than 10 Km/s, it is determined that the final motion state of the mobile carrier is moving.

The final motion state of the mobile carrier may also be determined according to a historical motion state of the mobile carrier, and the prediction motion state of the mobile carrier.

For example, when final motion states of the mobile carrier within the previous 2 seconds are moving, and the prediction motion state at the present 1 second is rest, it is determined that the final motion state of the mobile carrier is moving with a slow speed; when the final motion states of the mobile carrier within the previous 2 seconds are respectively moving and rest, and the prediction motion state at the present 1 second is rest, it is determined that the final motion state of the mobile carrier is rest; when the final motion states of the mobile carrier within the previous 2 seconds are rest, and the prediction motion state at the present 1 second is moving, it is determined that the final motion state of the mobile carrier is moving with a low speed.

In conclusion, when the motion state presented by the mobile carrier is from rest to motion, it is determined that the final motion state at the present 1 second is moving with a slow speed; when the motion state presented by the mobile carrier is a sequent rest state, it is determined that the final motion state at the present 1 second is rest; when the motion state presented by the mobile carrier at the present 1 second is moving, it is determined that the final motion state at the present 1 second is moving.

The final motion state of the mobile carrier may also be determined according to the historical motion state of the mobile carrier, the historical driving speed of the mobile carrier, and the prediction motion state of the mobile carrier.

With the technical solution of this embodiment of the present disclosure, the final motion state of the mobile carrier is determined according to the historical motion information of the mobile carrier, and the prediction motion state of the mobile carrier, thereby improving the accuracy for determining the motion state of the mobile carrier.

Embodiment 3

Figure 3:
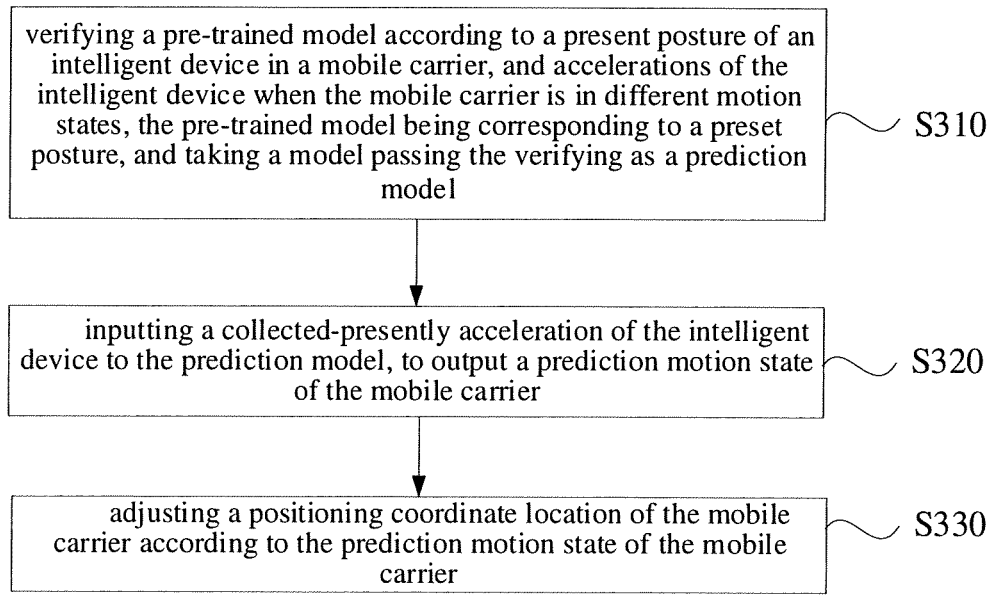
FIG. 3 is a flow chart illustrating a motion detection method provided in Embodiment 3 of the present disclosure.

FIG. 3 is a flow chart illustrating a motion detection method provided in Embodiment 3 of the present disclosure. This embodiment is an alternative solution provided on the basis of the above embodiments. As illustrated in FIG. 3, the motion detection method provided by this embodiment includes acts in the following blocks.

At block S310, a pre-trained model is verified according to a present posture of an intelligent device in a mobile carrier, and accelerations of the intelligent device when the mobile carrier is in different motion states, and a model passing the verification is taken as a prediction model. The pre-trained model corresponds to a preset posture.

At block S320, a collected-presently acceleration of the intelligent device is inputted to the prediction model, to output a prediction motion state of the mobile carrier.

At block S330, a positioning coordinate location of the mobile carrier is adjusted according to the prediction motion state of the mobile carrier.

In detail, adjusting the positioning coordinate location of the mobile carrier according to the prediction motion state of the mobile carrier includes: in response to a positioning coordinate location of the mobile carrier at a present time point being a first location, a positioning coordinate location of the mobile carrier at a next time point being still the first location, and both a motion state of the mobile carrier at the present time point and a prediction motion state of the mobile carrier at the next time point being moving, adjusting the positioning coordinate location of the mobile carrier at the next time point to be a next location of the first location; or in response to all the prediction motion states of the mobile carrier at different time points being rest, keeping positioning coordinate locations of the mobile carrier at different time points same.

The next location of the first location may be determined according to a determined navigation road.

With the technical solution of this embodiment of the present disclosure, the positioning coordinate location of the mobile carrier is adjusted according to the prediction motion state of the mobile carrier, thereby implementing an accurate determination for the location of the mobile carrier, and avoiding a location shift of the mobile carrier.

Embodiment 4

Figure 4:
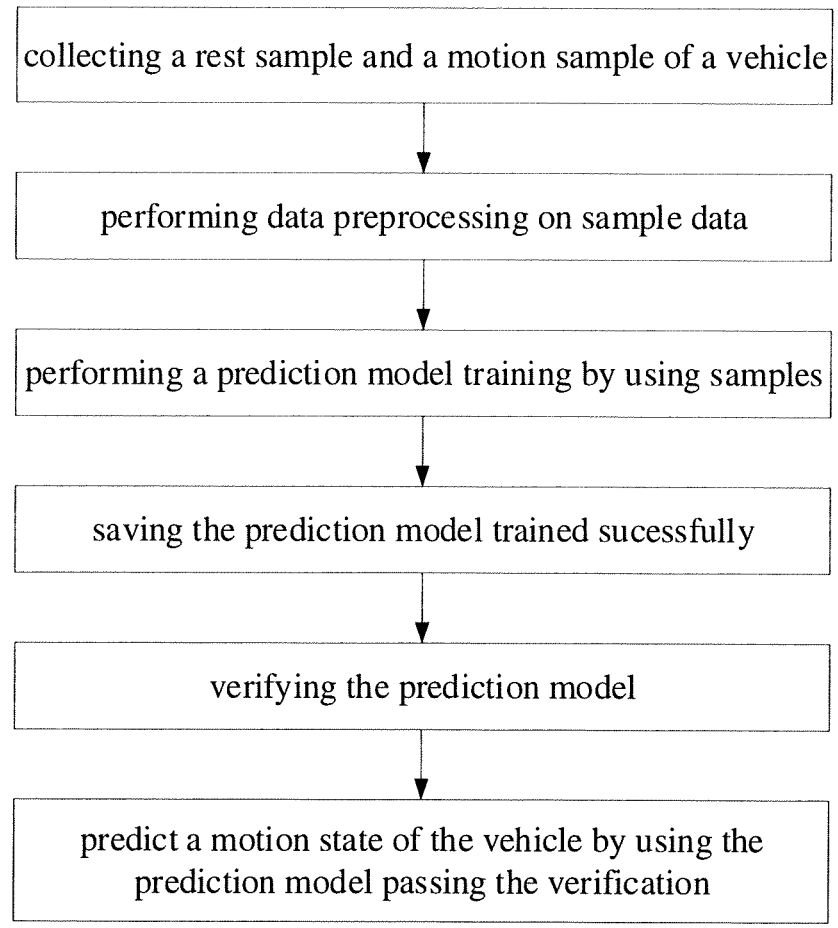
FIG. 4 is a flow chart illustrating a motion detection method provided in Embodiment 4 of the present disclosure.

FIG. 4 is a flow chart illustrating a motion detection method provided in Embodiment 4 of the present disclosure.

This embodiment is an alternative solution provided on the basis of the above embodiments taking that the intelligent device is a navigation mobile phone, the mobile carrier is a vehicle, and the motion state is rest or moving as an example. As illustrated in FIG. 4, the motion detection method provided by this embodiment is as follows.

A sample is collected automatically.

Each group of samples comprises accelerations and postures. The acceleration may include acceleration values in three directions of X, Y and Z. The acceleration values in three directions may be obtained through a three-axis acceleration sensor of the mobile phone. Collection frequency of the samples and collection time of the samples may be provided based on an actual need.

Each sample also has a posture attribution, to represent a posture when the mobile phone is placed. When the posture changes, it is likely that the model also fails. The posture is determined by an angle between the acceleration values in the three directions of x, y and x, and a gravity direction.

In detail, the sample collection may include following.

The sample that the motion state is rest starts to be collected when a vehicle speed value determined based on GPS is 0 or lower than a preset speed threshold of a rest sample. The collection process lasts for 3 seconds, and it is determined that the sample collection successes when the motion state of the vehicle keeps rest for 3 sequent seconds. When the motion state of the vehicle within the 3 seconds changes, the present collection falls and a next triggering is waited.

A detailed triggering condition of the sample collection may be provided based on the actual need.

When the speed value of the vehicle determined based on GPS is within a scope of the preset speed thresholds of a motion sample, the sample that the motion state is moving starts to be collected. The collection process lasts for 3 seconds, and it is determined that the sample collection successes when the motion state of the vehicle keeps the above moving condition for 3 sequent seconds. When the motion state of the vehicle within the 3 seconds changes, the present collection falls and a next triggering is waited.

The limitation for the vehicle speed should not be too high when the vehicle is moving. That is because the faster the vehicle moves, the larger a shake of the acceleration collected by the acceleration sensor, which is disadvantage to later model training.

Data preprocessing is performed on the collected samples.

An average and an extreme difference of the collected samples are determined when the motion state of the vehicle is rest. It is determined whether the average and the extreme difference are within a preset scope, so as to perform effective verification on the collected samples. In an ideal state, the accelerations in the collected samples are 0 when the motion state of the vehicle is rest.

Noise filtering is performed on the collected samples when the motion state of the vehicle is moving, to remove a random interference caused by an uneven road, a rapid acceleration, or a sharp turn, and merely reserve samples with normal shift in the road.

Because time that the vehicle is moving is relatively more than time that the vehicle is rest, the sample with a plurality of random interferences when the motion state of the vehicle is moving may be discarded and re-obtained.

It is determined whether the posture change value among the samples which are collected sequentially within the 3 seconds when the motion states of the vehicle are moving is greater than a preset posture threshold. If yes, the sample is discarded.

A difference between the average postures of the samples for training the same model when the motion state of the vehicle is moving and when the motion state of the vehicle is rest is also not greater than the above preset posture threshold.

The model training is performed on the samples after data reprocessing based on the neural network.

A training error needs within a preset scope, to avoid poor fitting and over fitting.

The iteration number of the models is controlled within a preset iteration number, to avoid large amounts of calculations. The iteration number of the models beyond to the preset iteration number represents that the sample is not ideal. In this case, the sample may be re-obtained, and re-training is performed by using the re-obtained sample.

The model includes two parts: network structures and weight parameters. The model and the corresponding posture need to be saved persistently, to facilitate verification in using. The previous model may be loaded by default in each using, and the model is validated after passing the verification.

When the number of model training failures exceeds a preset training number, the model training is no longer performed.

The verification is performed on the pre-trained model according to the present posture of the mobile phone in the vehicle, and the acceleration of the mobile phone when the vehicle is rest or moving.

Since the sample is collected in a live for training model, the user may change the location and the posture of the mobile phone when the model is used in the prediction after being training. The change of the location and the posture of the mobile phone may affect the accuracy of the prediction. Therefore, the model needs to be verified. The verification may be silent (that is, running in the background), and the user is not aware.

In order to avoid that the location shift of the point positioned by GPS results in an error verification, after at least 1 second after the verification is triggered, the acceleration of the mobile phone starts to be collected within a duration when the vehicle is rest or moving is greater than 3 seconds, to perform the verification on the model.

The verification needs to be performed respectively once when the vehicle is rest and moving. When the verification successes, the model is effective (that is, the model is taken as the prediction model). When the verification falls for a sequent preset number, the re-training for the model needs to be started.

Since the second verification, when the verification successes for a sequent preset number, the model is effective.

The model which is verified successfully is saved in the local.

When it is detected that a difference between the present posture of the mobile phone and the preset posture corresponding to the model is greater than the preset posture threshold, the model fails.

The prediction is performed by using the model passing the verification.

In detail, the acceleration of the mobile phone is collected when the vehicle is rest or moving within a short duration (such as 1 second). The collected acceleration of the intelligent device is inputted to the model passing the verification, to output the prediction motion state of the vehicle.

In order to improve the prediction accuracy of the motion state of the vehicle, the outputting for the prediction motion state at the present 1 second needs to combine with the prediction motion state at previous seconds, to obtain a comprehensive determination conclusion.

After each prediction, the driving speed of the vehicle is determined based on the coordinate location of the point positioned in combination with the prediction motion state, and the accuracy of the model is counted according to the determined vehicle driving speed.

In order to improve the prediction accuracy of the motion state of the vehicle, the present prediction motion state of the vehicle is determined in combination with the historical driving speed of the vehicle.

In case the points positioned by GPS and by network are not reliable, with this embodiment of the present disclosure, it is predicted that the vehicle is rest or moving by the original data of the sensor of the mobile phone, thereby avoiding that the positioned point of the vehicle in the mobile phone software generates bad experience problems such as the location shift in a case where the vehicle is in real parking.

It should be noted that, through the technical teaching of this embodiment, those skilled in the art have the motivation to combine any of the embodiments described above to achieve the determination of the motion state of the mobile carrier.

Embodiment 5

Figure 5:
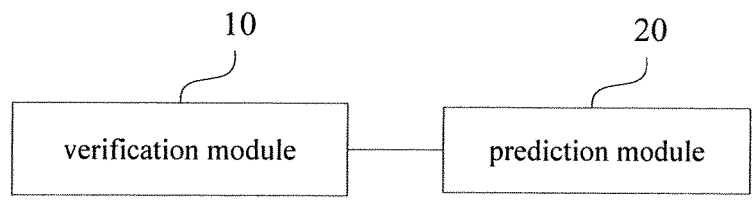
FIG. 5 is a block diagram illustrating a motion detection apparatus provided in Embodiment 5 of the present disclosure.

FIG. 5 is a block diagram illustrating a motion detection apparatus provided in Embodiment 5 of the present disclosure. This embodiment is an alternative solution provided based on the above embodiments. As illustrated in FIG. 5, the motion detection apparatus includes a verification module 10 and a prediction model 20.

The verification module 10 is configured to verify a pre-trained model according to a present posture of an intelligent device in a mobile carrier, and accelerations of the intelligent device when the mobile carrier is in different motion states, and take a model passing the verifying as a prediction model. The pre-trained model corresponds to a preset posture.

The prediction module 20 is configured to input a collected-presently acceleration of the intelligent device to the prediction model, to output a prediction motion state of the mobile carrier.

With the embodiments of the present disclosure, the prediction motion data of the mobile carrier is determined according to the acceleration of the intelligent device, and the prediction model, thereby implementing to predict the motion state of the mobile carrier.

When locations or states of the intelligent device are different, corresponding prediction models are different. Therefore, the pre-trained model is verified according to the present posture of the intelligent device in the mobile carrier, and the accelerations of the intelligent device when the mobile carrier is in different motion states, thereby ensuring that the determined prediction model may be appropriate for the present location and the present posture of the intelligent device, and improving a prediction accuracy for the motion state of the mobile carrier.

Further, the verification module includes a verification unit.

The verification unit is configured to, in response to the preset posture corresponding to the pre-trained model matching with the present posture of the intelligent device in the mobile carrier, verify the matched pre-trained model by using one selected from the accelerations of the intelligent device, the selected acceleration corresponding to a motion state having a duration being greater than a preset duration threshold from different motion states.

Further, the apparatus further includes a state determining module.

The state determining state is configured to, after inputting the collected-presently acceleration of the intelligent device to the prediction model, to output the prediction motion state of the mobile carrier, determine a final motion state of the mobile carrier according to historical motion information of the mobile carrier, and the prediction motion state of the mobile carrier.

Further, the state determining module includes a state determining unit.

The state determining unit is configured to determine the final motion state of the mobile carrier according to a historical driving speed and/or a historical motion state of the mobile carrier, and the prediction motion state of the mobile carrier.

Further, the apparatus further includes a location adjusting module.

The location adjusting module is configured to, after inputting the collected-presently acceleration of the intelligent device to the prediction model, to output the prediction motion state of the mobile carrier, adjust a positioning coordinate location of the mobile carrier according to the prediction motion state of the mobile carrier.

Further, the location adjusting module includes a location adjusting unit.

The location adjusting unit is configured to, in response to a positioning coordinate location of the mobile carrier at a present time point being a first location, a positioning coordinate location of the mobile carrier at a next time point being still the first location, and both a motion state of the mobile carrier at the present time point and a prediction motion state of the mobile carrier at the next time point being moving, adjust the positioning coordinate location of the mobile carrier at the next time point to be a next location of the first location; or in response to all the prediction motion states of the mobile carrier at different time points being rest, keep positioning coordinate locations of the mobile carrier at different time points same.

Embodiment 6

Figure 6:
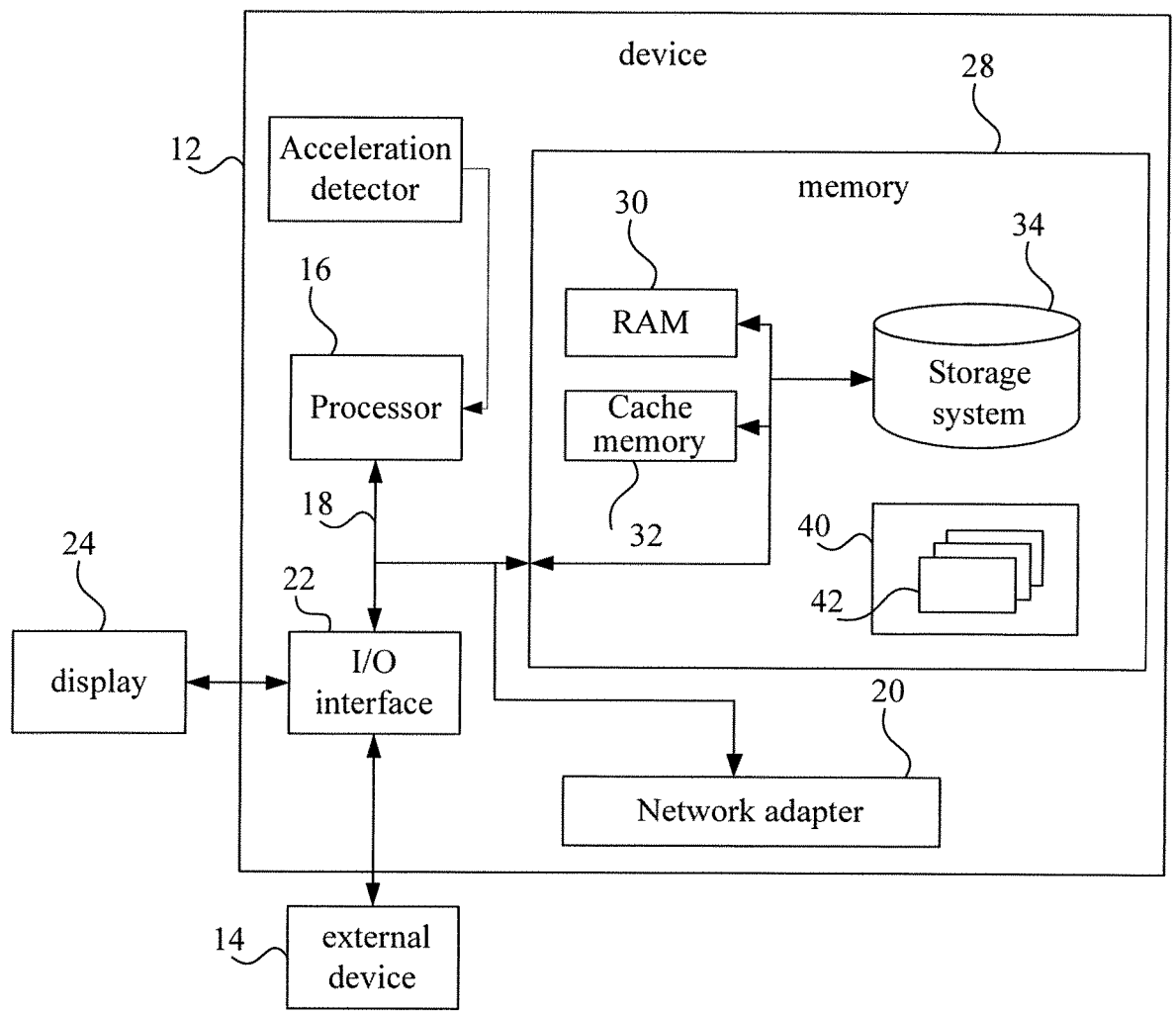
FIG. 6 is a schematic diagram illustrating a device provided in Embodiment 6 of the present disclosure.

FIG. 6 is a schematic diagram illustrating a device provided in Embodiment 6 of the present disclosure. FIG. 6 is a block diagram illustrating an exemplary device 12 applicable to implement embodiments of the present disclosure. The device 12 illustrated in FIG. 6 is only an example, which may not bring any limitation to functions and scope of embodiments of the present disclosure.

As illustrated in FIG. 6, the device 12 is embodied in the form of a general-purpose computer device. Components of the device 12 may include but be not limited to: one or more processors or processing units 16, a system memory 28, a bus 18 connecting different system components (including the system memory 28 and the processing unit 16), and an acceleration detector configured to detect an acceleration of the device. Typically, the acceleration detector may be a three-axis acceleration detector.

The bus 18 represents one or more of several bus structures, including a storage bus or a storage controller, a peripheral bus, an accelerated graphics port, and a processor, or a local bus with any bus structure in the plurality of bus structures. For example, these architectures include but are not limited to an ISA (Industry Standard Architecture) bus, a MAC (Micro Channel Architecture) bus, an enhanced ISA bus, a VESA (Video Electronics Standards Association) local bus, and a PCI (Peripheral Component Interconnection) bus.

The device 12 typically includes various computer system readable mediums. These mediums may be any usable medium that may be accessed by the device 12, including volatile and non-volatile mediums, removable and non-removable mediums.

The system memory 28 may include computer system readable mediums in the form of volatile medium, such as a RAM (Random Access Memory) 30 and/or a cache memory 32. The device 12 may further include other removable/non-removable, volatile/non-volatile computer system storage mediums. Only as an example, the storage system 34 may be configured to read from and write to non-removable, non-volatile magnetic mediums (not illustrated in FIG. 6, which is usually called "a hard disk driver"). Although not illustrated in FIG. 6, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The device 12 may communicate with one or more external devices 14 (such as a keyboard, a pointing device, a display 24), may further communicate with one or more devices enabling a user to interact with the device 12, and/or may communicate any device (such as a network card, and a modem) enabling the device 12 to communicate with one or more other computer devices. Such communication may occur via an Input/Output (I/O) interface 22. Moreover, the device 12 may further communicate with one or more networks (such as LAN (Local Area Network), WAN (Wide Area Network) and/or public network, such as Internet) via a network adapter 20. As illustrated in FIG. 6, the network adapter 20 communicates with other modules of the device 12 via the bus 18. It should be understood that, although not illustrated in FIG. 6, other hardware and/or software modules may be used in combination with the device 12, including but not limited to: microcode, device drivers, redundant processing units, external disk drive arrays, RAID (Redundant Array of Independent Disks) systems, tape drives, and data backup storage systems, etc.

The processor 16, by operating programs stored in the system memory 28, executes various function applications and data processing, for example implements a motion detection method provided in embodiments of the present disclosure.

Embodiment 7

Embodiment 7 of the present disclosure provides a computer readable storage medium having a computer program stored thereon. When executed by a processor, the computer program is configured to execute the motion detection method according to any of embodiments of the present disclosure.

The method includes: verifying a pre-trained model according to a present posture of an intelligent device in a mobile carrier, and accelerations of the intelligent device when the mobile carrier is in different motion states, the pre-trained model being corresponding to a preset posture; taking a model passing the verifying as a prediction model; and inputting a collected-presently acceleration of the intelligent device to the prediction model, to output a prediction motion state of the mobile carrier.

The computer storage medium involved in embodiments of the present disclosure may employ any combination of one or more computer readable mediums. The computer readable medium may be a computer readable signal medium or a computer readable storage medium. A computer readable storage medium may be, for example, but not limited to an electronic, magnetic, optical, electromagnetic, infrared, or semiconductor system, apparatus, or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The data signal transmitted may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet Service Provider).

It should be noted, the above are only preferred embodiments of the present disclosure and the applied technical principle. It should be understood by the skilled in the art that, the present disclosure is not limited the specific embodiments described herein. For the skilled in the art, various apparent changes, modifications, and substitutions will be performed without departing from the scope of the present disclosure. Therefore, although the present disclosure has been described in detail by the above embodiments, the present disclosure is not merely limited by the above embodiments. Without departing from the concept of the present disclosure, more other equivalent embodiments may also be included. The scope of the present disclosure is decided by the appended claims.

What is claimed is:

1. A motion detection method, comprising:
determining whether a preset posture corresponding to a pre-trained model matches with a present posture of an intelligent device in a mobile carrier, comprising: determining a difference between the preset posture corresponding to the pre-trained model and the present posture of the intelligent device in the mobile carrier; determining whether the difference is less than a preset posture threshold; and determining that the preset posture corresponding to the pre-trained model matches with the present posture of the intelligent device in the mobile carrier, in response to that the difference is less than the preset posture threshold; in which pre-trained models obtained by training under different postures of the intelligent device are different;
in response to the preset posture corresponding to the pre-trained model matching with the present posture of the intelligent device in the mobile carrier, verifying the matched pre-trained model according to accelerations of the intelligent device when the mobile carrier is in different motion states, in which the pre-trained model is trained based on different sample motion states of the mobile carrier and sample accelerations of the intelligent device when the mobile carrier is in the different sample motion states;
taking a model passing the verifying as a prediction model; and
inputting a collected-presently acceleration of the intelligent device to the prediction model, to output a prediction motion state of the mobile carrier.

2. The method of claim 1, wherein, verifying the matched pre-trained model according to the accelerations of the intelligent device when the mobile carrier is in different motion states, comprises:
verifying the matched pre-trained model by using one selected from the accelerations of the intelligent device, the selected acceleration corresponding to a motion state having a duration being greater than a preset duration threshold from different motion states.

3. The method of claim 1, further comprising:
determining a final motion state of the mobile carrier according to historical motion information of the mobile carrier, and the prediction motion state of the mobile carrier.

4. The method of claim 3, wherein, determining the final motion state of the mobile carrier according to the historical motion information of the mobile carrier, and the prediction motion state of the mobile carrier comprises:
determining the final motion state of the mobile carrier according to a historical driving speed and/or a historical motion state of the mobile carrier, and the prediction motion state of the mobile carrier.

5. The method of claim 1, further comprising:
adjusting a positioning coordinate location of the mobile carrier according to the prediction motion state of the mobile carrier.

6. The method of claim 5, wherein, adjusting the positioning coordinate location of the mobile carrier according to the prediction motion state of the mobile carrier comprises:
in response to a positioning coordinate location of the mobile carrier at a present time point being a first location, a positioning coordinate location of the mobile carrier at a next time point being still the first location, and both a motion state of the mobile carrier at the present time point and a prediction motion state of the mobile carrier at the next time point being moving, adjusting the positioning coordinate location of the mobile carrier at the next time point to be a next location of the first location, or
in response to all the prediction motion states of the mobile carrier at different time points being rest, keeping positioning coordinate locations of the mobile carrier at different time points same.

7. A device, comprising:
one or more processors;
a storage device, configured to store one or more programs; and
an acceleration detector, configured to detect an acceleration of the device;
wherein, when the one or more programs are executed by the one or more processors, the one or more processors are caused to implement a motion detection method comprising:
determining whether a preset posture corresponding to a pre-trained model matches with a present posture of an intelligent device in a mobile carrier, comprising: determining a difference between the preset posture corresponding to the pre-trained model and the present posture of the intelligent device in the mobile carrier; determining whether the difference is less than a preset posture threshold; and determining that the preset posture corresponding to the pre-trained model matches with the present posture of the intelligent device in the mobile carrier, in response to that the difference is less than the preset posture threshold; in which pre-trained models obtained by training under different postures of the intelligent device are different;
in response to the preset posture corresponding to the pre-trained model matching with the present posture of the intelligent device in the mobile carrier, verifying the matched pre-trained model according to accelerations of the intelligent device when the mobile carrier is in different motion states, in which the pre-trained model is trained based on different sample motion states of the mobile carrier and sample accelerations of the intelligent device when the mobile carrier is in the different sample motion states;
taking a model passing the verifying as a prediction model; and
inputting a collected-presently acceleration of the intelligent device to the prediction model.

8. The device of claim 7, wherein verifying the matched pre-trained model according to the accelerations of the intelligent device when the mobile carrier is in different motion states, comprises:
  verifying the matched pre-trained model by using one selected from the accelerations of the intelligent device, the selected acceleration corresponding to a motion state having a duration being greater than a preset duration threshold from different motion states.

9. The device of claim 7, wherein the method further comprises:
  determining a final motion state of the mobile carrier according to historical motion information of the mobile carrier, and the prediction motion state of the mobile carrier.

10. The device of claim 9, wherein determining the final motion state of the mobile carrier according to the historical motion information of the mobile carrier, and the prediction motion state of the mobile carrier comprises:
  determining the final motion state of the mobile carrier according to a historical driving speed and/or a historical motion state of the mobile carrier, and the prediction motion state of the mobile carrier.

11. The device of claim 7, wherein the method further comprises:
  adjusting a positioning coordinate location of the mobile carrier according to the prediction motion state of the mobile carrier.

12. The device of claim 11, wherein, adjusting the positioning coordinate location of the mobile carrier according to the prediction motion state of the mobile carrier comprises:
  in response to a positioning coordinate location of the mobile carrier at a present time point being a first location, a positioning coordinate location of the mobile carrier at a next time point being still the first location, and both a motion state of the mobile carrier at the present time point and a prediction motion state of the mobile carrier at the next time point being moving, adjusting the positioning coordinate location of the mobile carrier at the next time point to be a next location of the first location, or
  in response to all the prediction motion states of the mobile carrier at different time points being rest, keeping positioning coordinate locations of the mobile carrier at different time points same.

13. A non-transient computer readable storage medium having a computer program stored thereon, wherein, when the computer program is executed by a processor, a motion detection method is implemented, the motion detection method comprising:
  determining whether a preset posture corresponding to a pre-trained model matches with a present posture of an intelligent device in a mobile carrier, comprising: determining a difference between the preset posture corresponding to the pre-trained model and the present posture of the intelligent device in the mobile carrier; determining whether the difference is less than a preset posture threshold; and determining that the preset posture corresponding to the pre-trained model matches with the present posture of the intelligent device in the mobile carrier, in response to that the difference is less than the preset posture threshold; in which pre-trained models obtained by training under different postures of the intelligent device are different;
  in response to the preset posture corresponding to the pre-trained model matching with the present posture of the intelligent device in the mobile carrier, verifying the matched pre-trained model according to accelerations of the intelligent device when the mobile carrier is in different motion states, in which the pre-trained model is trained based on different sample motion states of the mobile carrier and sample accelerations of the intelligent device when the mobile carrier is in the different sample motion states;
  taking a model passing the verifying as a prediction model; and
  inputting a collected-presently acceleration of the intelligent device to the prediction model, to output a prediction motion state of the mobile carrier.

14. The non-transient computer readable storage medium of claim 13, wherein verifying the matched pre-trained model according to the accelerations of the intelligent device when the mobile carrier is in different motion states, comprises:
  verifying the matched pre-trained model by using one selected from the accelerations of the intelligent device, the selected acceleration corresponding to a motion state having a duration being greater than a preset duration threshold from different motion states.

15. The non-transient computer readable storage medium of claim 13, wherein the method further comprises:
  determining a final motion state of the mobile carrier according to historical motion information of the mobile carrier, and the prediction motion state of the mobile carrier.

16. The non-transient computer readable storage medium of claim 15, wherein determining the final motion state of the mobile carrier according to the historical motion information of the mobile carrier, and the prediction motion state of the mobile carrier comprises:
  determining the final motion state of the mobile carrier according to a historical driving speed and/or a historical motion state of the mobile carrier, and the prediction motion state of the mobile carrier.

17. The non-transient computer readable storage medium of claim 13, wherein the method further comprises:
  adjusting a positioning coordinate location of the mobile carrier according to the prediction motion state of the mobile carrier.

18. The non-transient computer readable storage medium of claim 17, wherein adjusting the positioning coordinate location of the mobile carrier according to the prediction motion state of the mobile carrier comprises:
  in response to a positioning coordinate location of the mobile carrier at a present time point being a first location, a positioning coordinate location of the mobile carrier at a next time point being still the first location, and both a motion state of the mobile carrier at the present time point and a prediction motion state of the mobile carrier at the next time point being moving, adjusting the positioning coordinate location of the mobile carrier at the next time point to be a next location of the first location, or
  in response to all the prediction motion states of the mobile carrier at different time points being rest, keeping positioning coordinate locations of the mobile carrier at different time points same.

* * * * *